US006556957B1

(12) United States Patent
Daumer

(10) Patent No.: US 6,556,957 B1
(45) Date of Patent: Apr. 29, 2003

(54) METHOD AND DEVICE FOR DETECTING DRIFTS, JUMPS AND/OR OUTLIERS OF MEASUREMENT VALUES

(76) Inventor: Martin Daumer, Monchbergstrasse 18, 81825 Munich (DE)

( * ) Notice: Subject to any disclaimer, the term of this patent is extended or adjusted under 35 U.S.C. 154(b) by 0 days.

(21) Appl. No.: 09/720,580

(22) PCT Filed: Jun. 22, 1999

(86) PCT No.: PCT/DE99/01820

§ 371 (c)(1),
(2), (4) Date: Feb. 26, 2001

(87) PCT Pub. No.: WO99/67758

PCT Pub. Date: Dec. 29, 1999

(30) Foreign Application Priority Data

Aug. 22, 1998 (DE) .......................................... 198 27 508
Aug. 28, 1998 (DE) .......................................... 198 39 047

(51) Int. Cl.[7] .......................... H04B 15/00; G08B 29/00
(52) U.S. Cl. ........................ 702/193; 702/194; 340/511
(58) Field of Search ................................ 702/193, 191, 702/190, 189, 194, 195, 198, 199; 700/51, 73; 340/511

(56) References Cited

U.S. PATENT DOCUMENTS

| | | | | | |
|---|---|---|---|---|---|
| 4,514,720 | A | * | 4/1985 | Oberstein et al. | 340/511 |
| 4,587,620 | A | * | 5/1986 | Niimi et al. | 702/193 |
| 4,639,885 | A | * | 1/1987 | Spock et al. | 702/193 |
| 4,644,331 | A | * | 2/1987 | Matsushita et al. | 340/587 |
| 4,757,303 | A | * | 7/1988 | Scheidweiler | 340/501 |
| 4,846,190 | A | * | 7/1989 | John | 600/544 |

FOREIGN PATENT DOCUMENTS

| | | | |
|---|---|---|---|
| DE | 44 17 574 | A | 3/1995 |
| EP | 0 070 449 | A | 1/1983 |
| EP | 0 121 048 | A | 10/1984 |
| EP | 0 248 298 | A | 12/1987 |
| GB | 2 161 966 | A | 1/1986 |

* cited by examiner

*Primary Examiner*—Hal Wachsman
*Assistant Examiner*—Manual L. Barbee

(57) ABSTRACT

A method for detection an alarm state of measurement signal values received by means for detecting measurement values, wherein an alarm state is triggered when for a currently received measurement signal value at least one pre-set limit value is exceeded, has a faster recognition of an alarm situation and at the same time a lower rate of false alarms when in a first step for measurement signal values which are subsequent in time their position parameter (2) and a corresponding deviation parameter (3) of the measurement signal values from the position parameter is calculated in an adjustable time window, wherein in a second step each further subsequent measurement signal value is compared to the position parameter (2) an weighted with the deviation parameter (3) in order to obtain a respective evaluation quantity, and wherein in a third step an outlier state (6) is detected when the evaluation quantity exceeds an adjustable outlier parameter, whereas an alarm state (8) indicating the presence of a significant drift or jump of the measurement signal values is detected when the evaluation quantity exceeds an adjustable alarm parameter.

36 Claims, 3 Drawing Sheets

2

$$\hat{\mu}(n) = \frac{1}{w} \sum_{i=n-w}^{n} Y_i$$

3

Figure 1:
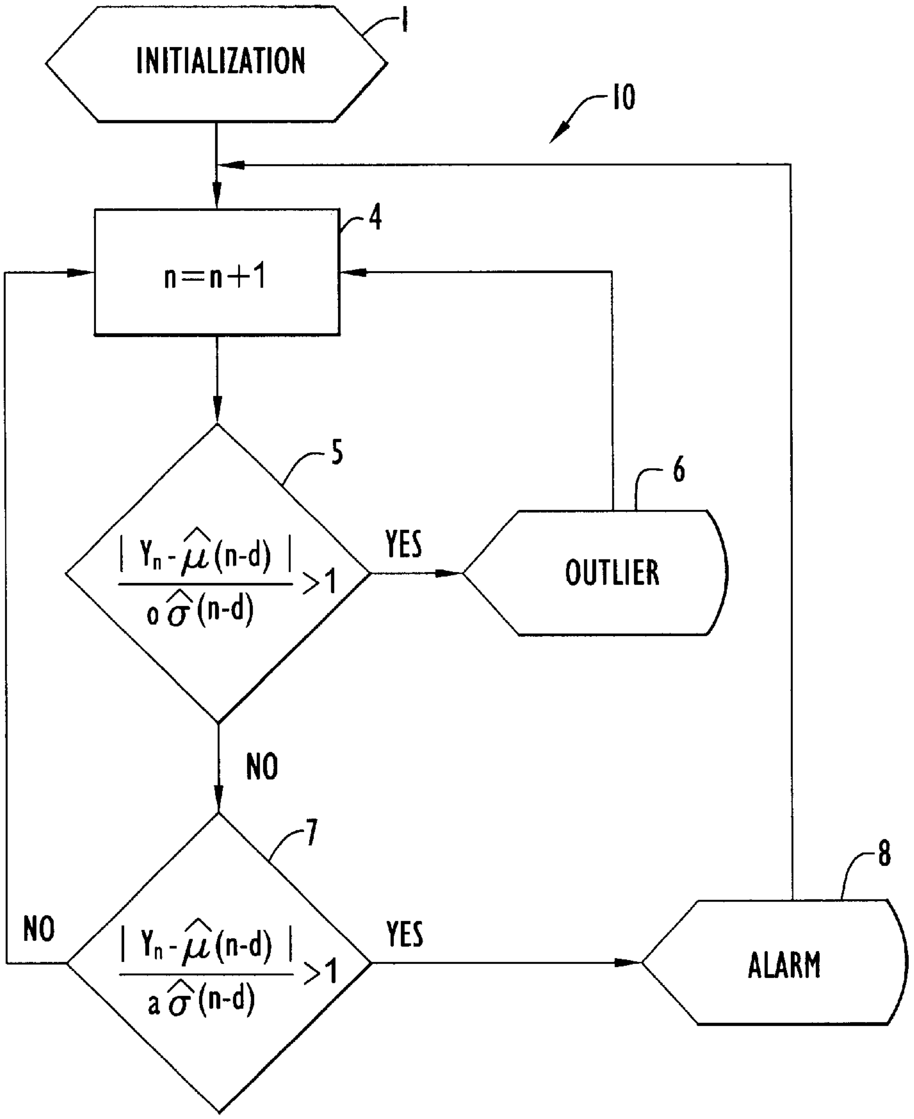

$$\hat{\sigma}(n) = \sqrt{\frac{1}{w-1} \sum_{i=n-w}^{n} (Y_i - \hat{\mu}(n))^2}$$

2

$$\hat{\mu}(n) = \frac{1}{w} \sum_{i=n-w}^{n} Y_i$$

3

$$\hat{\sigma}(n) = \sqrt{\frac{1}{w-1} \sum_{i=n-w}^{n} \left(Y_i - \hat{\mu}(n)\right)^2}$$

METHOD AND DEVICE FOR DETECTING DRIFTS, JUMPS AND/OR OUTLIERS OF MEASUREMENT VALUES

The invention relates to a method for detection of an alarm state and to the detection of drifts, jumps and/or outliers of measurement signal values received via measurement value sampling means, respectively, wherein an alarm state is triggered if for a currently received measurement signal value or for a value derived from the measurement values, respectively, a pre-determined limit value or pre-determined interval boundaries is or are passed, respectively. As examples for the extremely numerous applications of the method according to the invention, in particular, in the field of medicine the peri-operative monitoring, the monitoring of vital parameters in emergency rooms, the sleep monitoring, CTG (cardio-tocography) and in other fields fire and smoke warning systems, acoustic monitoring systems, such as baby phones, are mentioned.

Alarm systems for monitoring in the field of emergence medicine which typically display online and analyze heart-circulation-parameters (ECG, blood pressure), oxygen saturation (SpO2), gas exchange and metabolism parameters, as well as EEG and EMG, shall direct the attention of the treating medical doctor or nurse to potentially life threatening conditions of the monitored patient. An ideal alarm system would be characterized by the following properties which are all not optimally realized with the prior art:

1. Low rate of false alarms in order to avoid the undesired effect of getting used to the alarm situation and in order to counteract the tendency to deactivate the alarm which is often felt quite embarrassing.
2. Short delay times between the start of a critical situation and the triggering of the alarm in order to ensure a time advance for therapeutic measures which can under certain circumstances be life saving.
3. A high degree of adaptive performance in order to avoid that too many parameters have to be manually pre-set and re-adjusted during the treatment and distract, therefore, from the actual monitoring task. In particular, several subsequent alarm situations which have certain time differences shall be able to be recognized.
4. A high degree of information contents of the adjustable parameters in order to ensure that the alarm system can easily be operated without errors.
5. Simplicity as much as possible and, therefore, calculation speed as high as possible in order to avoid heavy calculations which would only be possible with expensive processors and storage elements in order to avoid possible restrictions regarding calculation time.
6. A high information contents in order to enable differentiated reactions.
7. Integrated detection of outliers in order to enable differentiation or distinction between life threatening states, failure of the apparatus or the supply lines and false measurements.
8. Clear decision rules in order to ensure the possibility for exportation and to enable a retrospective analysis and parameter correction.

Current alarm systems in the field of emergence medicine have a rate of false alarms of 70% to 99.5% dependent on the physiologic parameter which is monitored. The high rate of false alarms leads to a de-sensibilization of the monitoring staff and to often manually deactivating the alarm. The known alarm systems are triggered when the parameter to be monitored exceeds pre-set upper and lower thresholds, respectively. Such alarm systems are referred to as threshold value alarm systems. In order to lower the rate of false alarms the upper limit must be chosen rather high and the lower limit must be chosen rather low which unavoidably leads to larger time delays in situations which require an alarm. Furthermore, such an all-or-nothing system does not corresponded to the ISO standard which proposes an alarming system comprising several stages with different warning degrees.

As regards the known threshold alarm system an upper and a lower threshold value is predefined for a fluctuating signal, wherein an alarm is triggered when the signal moves out of the interval defined by the threshold values. The threshold value alarm has the following drawbacks. It is instable against outliers. It is not adaptive, i. e. the limiting values must be manually set and, in particular, regarding a signal comprising a drift, e.g. caused by a time variation of the detector sensitivity, it has to be permanently readjusted. If the limits of the threshold value alarm are set to far apart there are long delay times until an alarm is detected. However, when the limits are too narrow often false alarms are occurring. Hence, in practice a so-called “extreme limit” or an option such as “all alarms off for two minutes” is set. Further, the threshold value alarm system is not suitable for the case that a plurality of signals has to be monitored by an alarm system.

With respect to the prior art attention is drawn to the German patent publication DE 35 23 232 C2. From this document a fire alarm system is known for detecting and outputting of an analog value corresponding to a change in the physical appearance of the environmental conditions. Therein are provided a sampling apparatus for sampling an analog retrieval signal within a determined time period outputted from a detection section, a data processing apparatus for calculating a mean value from the detected data, as well as a storage apparatus in which these detected data can be stored and an alarm apparatus which indicates the presence of a fire after evaluation of the mean value. It is characteristic that the data processing apparatus is such that the detected data are sequentially written into the storage apparatus and continuously a running mean value is calculated from a certain number of the most recently stored detected data wherein the oldest stored value of the detected data according to the sequence is respectively replaced by the newest.

Further, from DE 31 27 324 A1 a method and an arrangement for increasing the response sensitivity and the safety against disturbances in a system for indicating dangers, in particular fires, is known.

From both above mentioned documents it is in particular not known to calculate a deviation parameter from the subsequent measurement values so that the method used to trigger the alarm would be adaptive and would have the ability to learn. Therefore, both above methods are not capable to adapt to, e.g. a time variation of the detector sensitivity.

Finally, DE 44 17 574 C2 relates to detection of a patient alarm using a target mode. In this method dynamic limits are defined for an intended change of physiologic parameters of a patient and an alarm is then generated when the measured parameter values lie outside of the dynamic limits. Thus, this document merely discloses a variation of the known threshold alarm.

It is, therefore, an object of the present invention to avoid the drawbacks of the prior and, in particular, to improve a method of the kind mentioned-above in which an “alarm situation” is faster recognized and which has a lower rate of false alarms compared to the prior art.

As far as the method aspect of the present invention is concerned this object is solved in that in a first step, for measurement signal values subsequent in time, in an adjustable time window the mean value thereof and the corresponding deviation of these measurement signal values from the mean value is calculated, in that in a second step each further subsequent measurement signal value is compared to the mean value and weighted with the deviation in order to obtain a corresponding evaluation quantity or evaluation parameter, and in that in a third step an outlier state is detected when or if the evaluation quantity exceeds or passes an adjustable outlier parameter, whereas when or if the evaluation quantity exceeds or passes an adjustable alarm parameter an alarm state is detected which indicates the presence of a significant drift or jump of the measurement signal values.

Therefore, in the method according to the invention two phases can be distinguished wherein in a first phase a time window is provided in which the characteristic course of the measurement signal values sampled or detected therein is evaluated, wherein the statistic mean value and the fluctuation width of the sampled measurement signal values about this mean value is detected. In the second phase of the method according to the invention the currently received measurement signal values are compared to the mean value and the deviation representing the fluctuation width wherein the evaluation quantity thus obtained represents a measure for the presence of a significant drift. Because the evolution in time of the measurement signal values sampled in the time window influences the evaluation quantity an overall higher degree of reliability when detecting alarm states is achieved compared to methods according to the prior art so that this results in a lower rate of false alarms. This is in particular due to the automatic readjustment of the interval limits. By the distinction provided according to the method according to the invention between outlier states which result in corruption and/or false alarms and alarm states in emergency medicine applications a differentiation between on the one hand life-threatening states and on the other hand device failures or supply line failures resulting in erroneous measurements is enabled which leads to a further reduction of the rate of false alarms.

An advantage of the method according to the present invention is that there is provided an online detection of outliers. Further it is advantageous that the method according to the invention is adaptive, i.e. for instance only physiologic limits have to be preset. Further, according to the invention drifts and/or jumps or discontinuities can automatically be recognized. Finally, the method according to the invention has only a short delay time.

In order to achieve a high calculation speed the evaluation quantity is calculated by taking the difference between the measurement signal value and the calculated mean value with a subsequent normalization of the difference. Therein, the weighting of the evaluation quantity is provided by calculating a quotient from the normalized difference between the measurement signal value and the mean value and the calculated deviation.

According a preferred embodiment of the method according to the invention an outlier state is detected when the normalized difference, weighted with the calculated deviation, between the measurement signal value and the mean value passes the set outlier parameter. In contrast thereto, an alarm state is detected when the normalized difference, weighted with the calculated deviation, between the measurement signal value and the mean value passes the adjusted alarm parameter.

In order to eliminate measurement errors which are for instance caused by apparatus failure or measurement artifacts, when an outlier state is present, the corresponding measurement signal value is replaced by the current mean value calculated in the time shifted window and the subsequent measurement signal value is processed.

As an alternative thereto also a different type of replacement can be provided which is, in particular, preferred due to statistical reasons. For instance, a noise can be added or an other imputation can be carried out. Therein, the outlier value can be replaced, in particular by a mean value plus an added random number which is taken from a probability distribution. Finally, such a corrupting or corrupted measurement value, respectively, can also simply be ignored for the further calculation.

It has turned out useful when the mean value of the subsequent measurement signal values is formed by a summation of the single measurement signal values wherein the number of the summation steps is determined by the width of the time window. Therein, as a deviation the standard deviation is used wherein the number of the summation steps is determined by the width of the time window.

An embodiment of the method according to the invention which is particularly advantageous regarding computational aspects comprises that the positioning of the time window is carried out using a time delay in order to also recognize small slopes in the course of the sampled measurement parameter so that also long term drifts can be detected by a correspondingly far positioned delayed window (delayed moving window). Also, short term drifts can be recognized with a corresponding near positioned delayed window (delayed moving window).

In order to facilitate distinguishing between occurring outlier states and alarm states the outlier parameter is set to a higher value compared to the alarm parameter.

It has turned out particularly useful when the width of the time window is preferably set to 10 measurement signal values subsequent in time and the outlier parameter is set to 6 and the alarm parameter to 3.

As regards the apparatus aspect, the above-identified object of the present invention is solved with an apparatus comprising a measurement values sampling device for receiving measurement value signals and a measurement value transmission device for transforming and processing the received measurement values signals as well as an alarm device which can be triggered by passing of a limit value by providing a storage device for sampling the measurement signal values in a time window which is adjustable regarding its width and time delay, wherein a computation means is provided for calculating the mean values and the corresponding deviations in an initialization phase for measurement signal values subsequent in time in the adjustable time window, and wherein a processor device is provided for obtaining an evaluation quantity in a process phase which actuates the alarm device when the evaluation quantity passes an adjustable alarm parameter.

By cooperation of the single components outlier states and alarm states can be distinguished from one or another according to the evaluation quantity obtained thereby so that the rate of false alarms can be significally reduced compared to methods according to the prior art.

Figure 2:
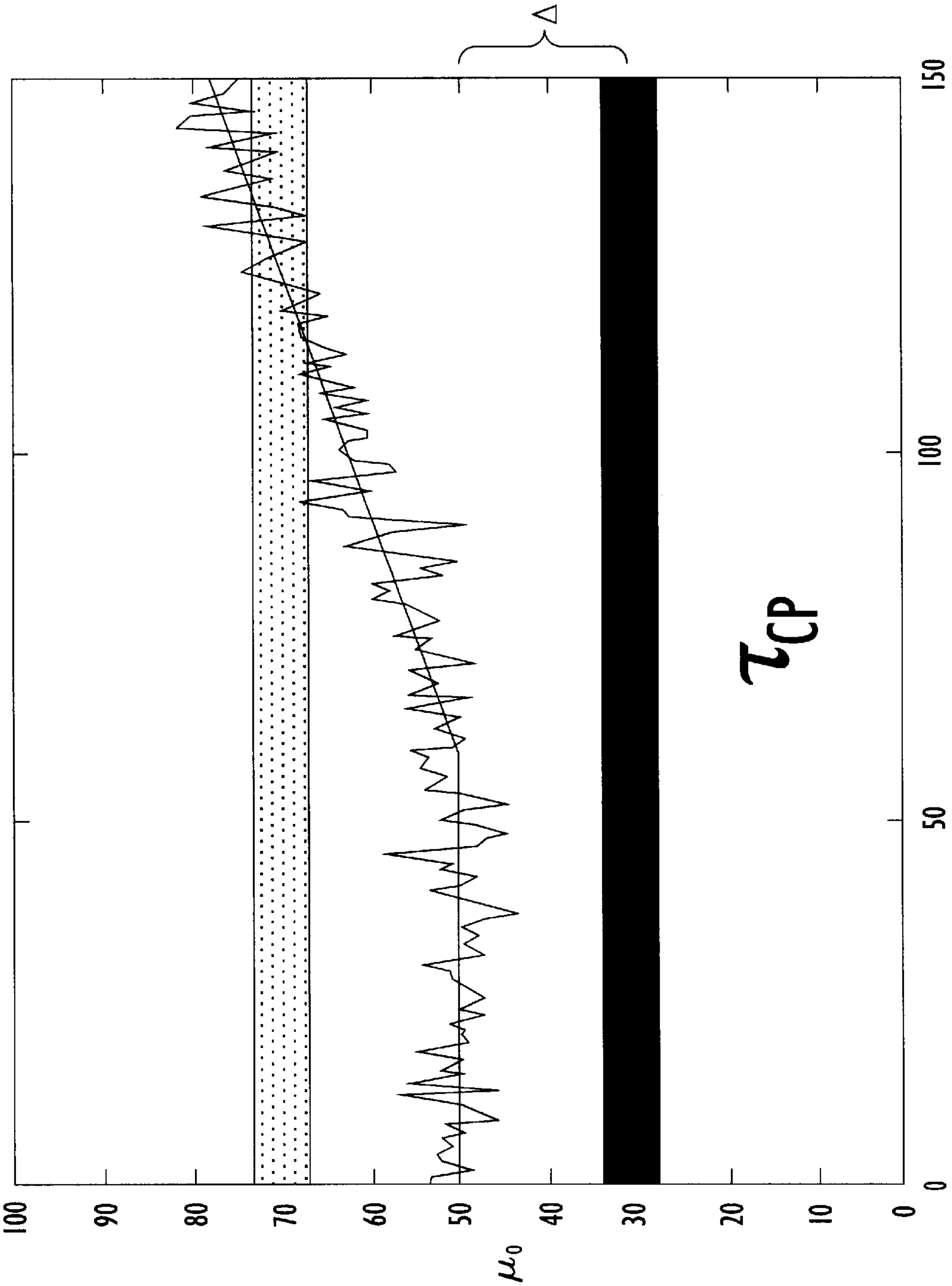
Figure 3A:
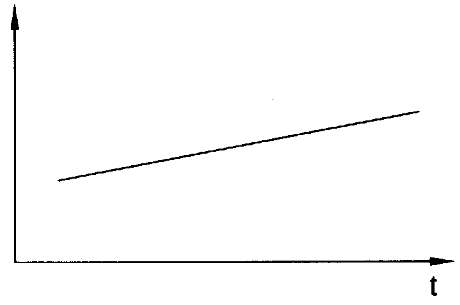
Figure 3B:
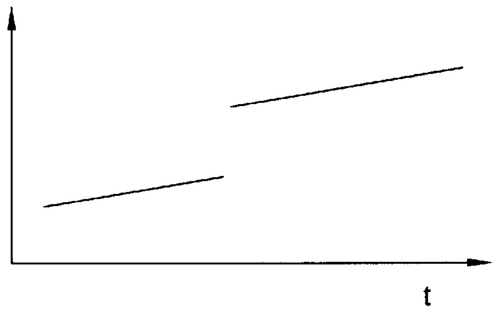

In the following an embodiment of the present invention will be explained taking reference to the accompanying drawings. In partially schematic views in the drawings shows:

FIG. 1 a flowchart comprising the essential process steps of the method according to the invention;

FIG. 2 a measurement value spectrum of the evolution in time of a physiologic measurement parameter;

FIG. 3*a* a strongly schematic representation of a drift;

FIG. 3*b* a strongly schematic representation of a jump; and

Figure 3C:
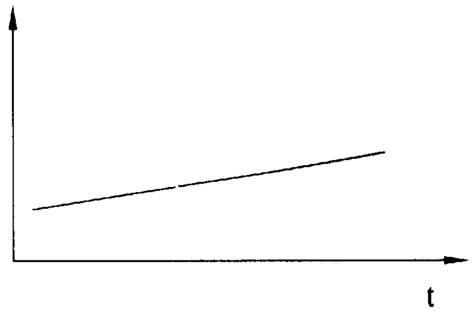

FIG. 3*c* a strongly schematic representation of an outlier.

The method according to the invention which is preferably implemented as a software program is illustrated in its essential process steps in the process scheme in FIG. 1 which is in its entirety designated with the reference numeral 10. During an initialization phase 1 a time window is provided in which in a length of i steps subsequent in time for the measurement signal values sampled in the time window a mean value 2 and a corresponding deviation 3 of the measurement signal values about this mean value are calculated. However, the mean value is not calculated from a series of the immediately preceding measurement values but from a time window of width ω in the past with the selectable time delay d. The lower summation limit for the calculation of the mean value results from the subtraction n−d−ω, wherein n is the number of the executed time steps, d is the time delay and ω is the window width. On the other hand the upper summation limit results from the subtraction n−d, so that the summation index i runs from n−d−ω to n−d. The same summation limits apply for the calculation of the deviation 3.

In the actual process phase in a process step 4 an incrementation is carried out. In another process step 5 the measurement signal value $Y_n$ sampled in a definite time step is compared to the mean value calculated in the initialization phase by calculating a difference and to provide this difference value with an absolute normalization. In order to take into consideration in this comparison also the deviation, the absolute normalized difference is weighted with the deviation by having the deviation as a divisor. The evaluation quantity obtained thereby serves as a measure for the detection of the presence of outlier states in this process step 4. If the evaluation quantity obtained from the currently sampled measurement signal value is larger than a pre-adjusted outlier parameter o (o>0), then the question in this process step 4 results in that an outlier state 6 is present. The outlier state can be ignored for the following calculation or can be replaced by a "reasonable" value. To this end, in particular imputation methods are suitable. For this case the process program returns to the incrementing instruction 4.

If the question in block 5 results in a negative result then in the question block 7 it is determined whether the evaluation quantity obtained for the currently sampled measurement signal value is larger than a pre-set alarm parameter a. In the case of an affirmative result an alarm state 8 is present. In the embodiment in this case the method returns to the initialization phase, whereas if the result is negative the method returns to the incrementation instruction. As a boundary condition for distinguishing between outlier states and alarm states a higher value is assigned to the outlier parameter compared to the alarm parameter. By distinguishing between outliers states and alarm states a differentiation between significant states and false measurements is achieved wherein false measurements can be the result of supply failure or apparatus artifacts. The recognition and elimination of such false measurements then results in a reduction of false alarms.

FIG. 2 shows the time behavior of a physiologic measurement parameter. Therein the x-axis serves as a time axis $\tau_{cp}$, whereas the y-axis represents the amplitude of the measurement signal.

FIG. 3*a* shows a strongly schematic representation of a drift. FIG. 3*b* shows a strongly schematic representation of a jump or discontinuity. FIG. 3*c* shows a strongly schematic representation of an outlier. The time dependency of a measured signal is represented therein.

In summary, the following is characteristic for the method according to the invention: the internal characteristic parameters of the algorithm are the window width ω (ω>0), the delay d (d>0), the initialization length i (i>ω+d), the outlier parameter o (o>0) and the alarm parameter a (a>0).

After an initialization phase having a length of i time steps the respective newly measured value is compared to a mean value estimated from the past measurement values in combination with the corresponding deviation (the empiric standard deviation)—insofar the algorithm is a natural generalization of the normal threshold value alarm in which mean value and deviation width are assumed to be known. However, the mean value is not calculated from a series of the immediately preceding measurement value but from a time window having the width ω in the past having the selectable time delay d. This type of calculation gets around the problem that the measurement values used for providing an estimate of the mean value and the deviation width have already started to drift away and, therefore, contribute to a significant bias which can even lead to not at all recognizing a sufficiently slow drift. However, by virtue of the freely selectable delay d the possibility is given to chose the limit angle of such a slope that is wanted to be just even recognized. Naturally, d has to be chosen the bigger the lower the slope is. Each newly measured value is compared to the current mean value estimated according to the method of the invention in the following way: if the measurement value is farther away from the estimated mean value by more than the product from the freely selectable outlier factor and the deviation then it is classified as an outlier and will be replaced for the further calculations by the current mean value (plus a random number having an expectation value of 0 and a deviation according to the estimated deviation). If this is not the case, and if, however, the measurement value is farther away from the estimated mean value by more than the product of the (selectable) alarm factor a and the deviation the presence of a significant drift is outputted depending on the direction of the deviation a drift upwards or downwards, respectively. In all other cases no message is outputted. Thereafter, the next time step is processed. It is selectable whether after an outputted alarm a new initialization shall take place, possibly with another selectable time delay or whether without new initialization the calculation shall continue. The window width ω influences the variations of the estimated mean value—the variations are reduced proportionally to the square root of ω.

For a number of uses the following values turn out as good starting values which can then be optimized: window width ω>10, outlier parameter o=6 and the alarm parameter a=3. The calculated informations outlier yes/no, alarm for drift upwards/downwards and no significant drift, respectively, can be outputted either directly on the screen or acoustically using pre-set sound sequences or can be outputted to the input of an intelligent alarm system.

The invention has before been described in more detail taking reference to a preferred embodiment. However, for a skilled person it is obvious that various alterations and modifications can be made without departing from the spirit underlying the invention. In particular, it has to be noted that in the present description the term "position parameter" designates in particular a mean value, a median and the like and the term "deviation parameter" designates a standard deviation, a quantile and the like.

What is claimed is:

1. A method for detecting an alarm state in a signal while avoiding false alarms from gradual signal drifts and outlier measurements, comprising:

obtaining a measurement value of the signal at a current time;

determining a position parameter and a deviation parameter from previous measurement values of the signal that were measured during a time window, wherein the time window is offset in time by an adjustable time delay from the current time;

computing at least one of an evaluation quantity, an alarm threshold, and an outlier threshold based on the measurement value, the position parameter, and the deviation parameter; and indicating an alarm state in response to the evaluation quantity exceeding the alarm threshold but not the outlier threshold, wherein the measurement value is determined to be an outlier measurement if the evaluation quantity exceeds the outlier threshold, whereby the alarm state indicates a significant drift or jump of the signal.

2. The method of claim 1, wherein the adjustable time delay corresponds to a slope of signal drift to be recognized as an alarm state.

3. The method of claim 1, wherein the evaluation quantity is computed based on at least a difference between the measurement value and the position parameter.

4. The method of claim 1, wherein the evaluation quantity is weighted by the deviation parameter.

5. The method of claim 1, wherein the evaluation quantity is computed based on a difference between the measurement value and the position parameter, wherein the difference is normalized by the deviation parameter.

6. The method of claim 1, wherein an alarm state is determined by a comparison of the evaluation quantity with the alarm threshold and the outlier threshold.

7. The method of claim 6, wherein the comparison of the evaluation quantity with the alarm threshold involves comparing a division of the evaluation quantity by the alarm threshold to unity.

8. The method of claim 7, wherein the comparison of the evaluation quantity with the outlier threshold involves comparing a division of the evaluation quantity by the outlier threshold to unity.

9. The method of claim 1, wherein the position parameter is a mean value of the previous measurement values within the time window.

10. The method of claim 1, wherein the deviation parameter is a standard deviation of the previous measurement values within the time window.

11. The method of claim 1, wherein the duration of the time window is adjustable.

12. The method of claim 11, wherein the number of previous measurement values within the time window is determined by the duration of the time window.

13. The method of claim 1, wherein the alarm threshold is adjustable.

14. The method of claim 1, wherein the outlier threshold is adjustable.

15. The method of claim 1, wherein the measurement value is replaced by a substitute value in response to the measurement value being determined to be an outlier measurement.

16. The method of claim 15, wherein the substitute value is the position parameter.

17. The method of claim 1, wherein the measurement value is removed from further calculations in response to the measurement value being determined to be an outlier measurement.

18. The method of claim 1, wherein the outlier threshold is greater than the alarm threshold.

19. The method of claim 1, wherein the adjustable time delay is greater than a duration between successive measurements.

20. An apparatus for detecting an alarm state in a signal while avoiding false alarms from gradual signal drifts and outlier measurements, comprising:

means for obtaining a measurement value of the signal at a current time;

a processor for determining a position parameter and a deviation parameter from previous measurement values of the signal that were measured during a time window, wherein the time window is offset in time by the processor by an adjustable time delay from the current time, the processor computing at least one of an evaluation quantity, an alarm threshold, and an outlier threshold based on the measurement value, the position parameter, and the deviation parameter, wherein the processor determines that a measurement value is an outlier measurement if the evaluation quantity exceeds the outlier threshold; and means for indicating an alarm state in response to the processor determining that the evaluation quantity exceeds the alarm threshold but not the outlier threshold, whereby the alarm state indicates a significant drift or jump of the signal.

21. The apparatus of claim 20, wherein the adjustable time delay corresponds to a slope of signal drift to be recognized as an alarm state.

22. The apparatus of claim 20, wherein the processor computes the evaluation quantity based on at least a difference between the measurement value and the position parameter.

23. The apparatus of claim 20, wherein the processor weights the evaluation quantity by the deviation parameter.

24. The apparatus of claim 20, wherein the processor computes the evaluation quantity based on a difference between the measurement value and the position parameter, wherein the difference is normalized by the deviation parameter.

25. The apparatus of claim 20, wherein the processor computes the position parameter as a mean value of the previous measurement values within the time window and computes the deviation parameter as a standard deviation of the previous measurement values within the time window.

26. The apparatus of claim 20, wherein the duration of the time window is adjustable by the processor.

27. The apparatus of claim 20, wherein the alarm threshold is adjustable by the processor.

28. The apparatus of claim 20, wherein the outlier threshold is adjustable by the processor.

29. The apparatus of claim 20, wherein the processor replaces the measurement value with a substitute value in response to the processor determining that the measurement value is an outlier measurement.

30. The apparatus of claim 20, wherein the processor removes the measurement value from further calculations in response to the processor determining that the measurement value is an outlier measurement.

31. An article of manufacture comprising a computer program carrier readable by a computer and embodying one or more instructions executable by the computer to detect an alarm state in a signal while avoiding false alarms from gradual signal drifts and outlier measurements, the computer program comprising:

program instructions for obtaining a measurement value of the signal at a current time;

program instructions for determining a position parameter and a deviation parameter from previous measurement values of the signal that were measured during a time window, wherein the time window is offset in time by an adjustable time delay from the current time;

program instructions for computing at least one of an evaluation quantity, an alarm threshold, and an outlier threshold based on the measurement value, the position parameter, and the deviation parameter; and program instructions for indicating an alarm state in response to the evaluation quantity exceeding the alarm threshold but not the outlier threshold, wherein the measurement value is determined to be an outlier measurement if the evaluation quantity exceeds the outlier threshold, whereby the alarm state indicates a significant drift or jump of the signal.

32. The article of manufacture of claim 31, wherein the adjustable time delay corresponds to a slope of signal drift to be recognized as an alarm state.

33. The article of manufacture of claim 31, wherein the evaluation quantity is computed based on at least a difference between the measurement value and the position parameter.

34. The article of manufacture of claim 31, wherein the evaluation quantity is weighted by the deviation parameter.

35. The article of manufacture of claim 31, wherein the position parameter is a mean value of the previous measurement values within the time window and the deviation parameter is a standard deviation of the previous measurement values within the time window.

36. The article of manufacture of claim 31, wherein the duration of the time window is adjustable.

* * * * *